Aug. 6, 1946.　　　M. SKOLNIK　　　2,405,528
METHOD OF FORMING SHAPED ARTICLES
Filed June 19, 1943　　　2 Sheets-Sheet 1

INVENTOR
Max Skolnik
BY Evans + McCoy
ATTORNEYS

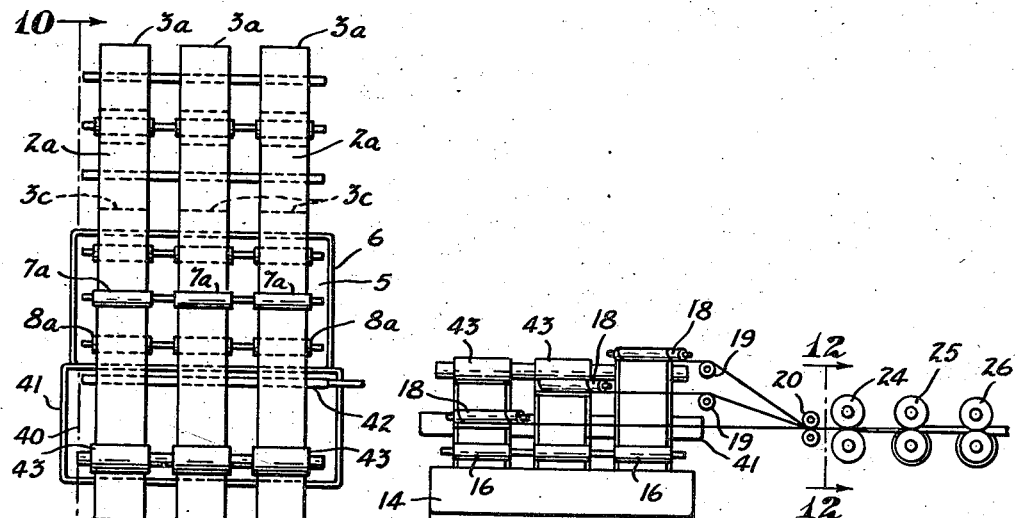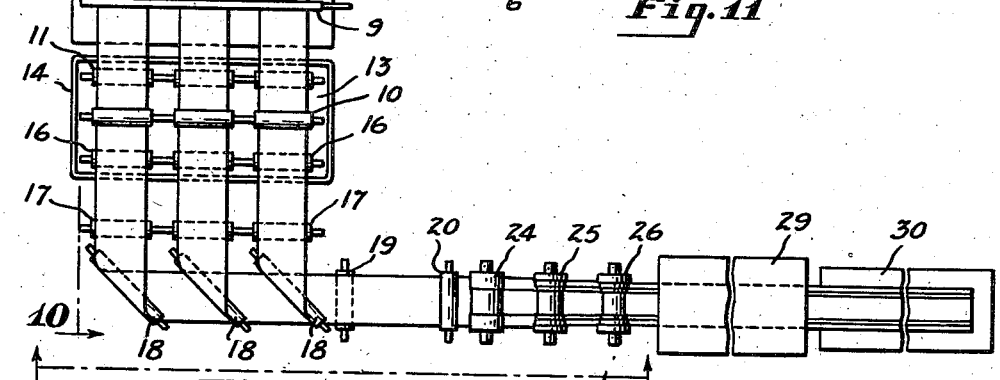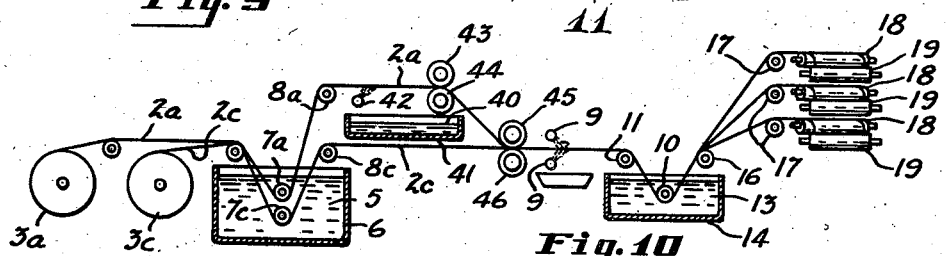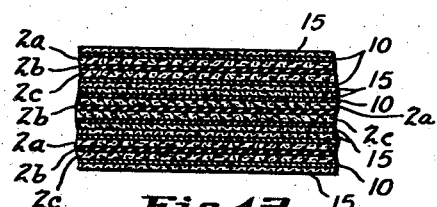

Patented Aug. 6, 1946

2,405,528

UNITED STATES PATENT OFFICE 2,405,528

METHOD OF FORMING SHAPED ARTICLES

Max Skolnik, Chicago, Ill., assignor to Fibro-Mold Specialties, Inc., Chicago, Ill., a corporation of Illinois Application June 19, 1943, Serial No. 491,540

4 Claims. (Cl. 154—110)

This invention relates to a shaped laminated material and method of making the same. It particularly relates to a water-resistant, hard, strong laminated material which may be shaped in plastic condition without the necessity of using high pressure and which will retain its shaped form during the hardening process without requiring the use of molds.

Magnesium oxychloride cement compositions are usually relatively brittle and are adversely affected by prolonged contact with moisture. Articles comprising a plurality of layers of fibrous material bonded together by magnesium oxychloride cement, or magnesium oxychloride cement articles reinforced by fibrous material, have not therefore gone into as extensive commercial use as would be expected. The usual process of making laminated articles having magnesium oxychloride cement as a bonding ingredient between the respective laminations have been unsatisfactory because of the relatively long time usually required for the magnesium cement to harden within the mold. Expensive mold equipment is utilized for too great a period per unit of production.

It is an object of the present invention to provide magnesium oxychloride cement articles which are strong, relatively light in weight and unaffected by moisture.

It is another object of the present invention to provide low-cost, water-resistant, durable formed or shaped articles comprising magnesium oxychloride cement reinforced by fibrous sheet material.

It is another object of the present invention to provide a method of making formed or shaped articles having magnesium oxychloride reinforced by fibrous material, wherein molds or forming devices are not required to obtain the plastic material in shaped form during the entire setting period.

It is a further object of the present invention to provide formed or shaped articles comprising a plurality of layers of fibrous sheet material bonded together by magnesium oxychloride cement compositions, wherein the materials may be shaped and formed in a continuous process without requiring the material to be maintained within molds during the entire hardening or setting period.

Other objects will be apparent from the following description of the invention as illustrated in the accompanying drawings, in which:

Fig. 9 is a schematic plan view of a modified form of apparatus for carrying out the present invention;

Fig. 10 is a schematic elevational view as seen from the line 10—10 of Fig. 9;

Fig. 11 is a schematic front elevational view of a portion of the apparatus as seen from line 11—11 of Fig. 9; and Fig. 12 is a partial sectional view on the line 12—12 of Fig. 11.

The shaped articles embodying the present invention comprise a plurality of layers of bitumen-impregnated sheet material. The sheet material is preferably a felted sheet material such as felt paper impregnated with a normally hard bitumen or asphalt, e. g., a relatively high melting point pitch such as residue obtained after the distillation or extraction of volatile ingredients and oils from coal tar and having a melting point of about 300 to 315° F. or thereabouts. The bitumen-impregnated fibrous sheet material is also preferably coated on both sides with a normally solid but lower melting bitumen, such as a normally hard asphalt, including gilsonite and the like. The sheets of the bitumen-impregnated material are bonded together with a layer of a plastic composition comprising magnesium oxychloride cement as the major binding ingredient. The plastic composition utilized has a relatively high exothermic reaction during setting and preferably contains a substantial amount of a relatively finely divided, relatively hard or relatively high melting bitumen, such as finely divided "core pitch," "air-blown pitch," or the finely divided residue which is obtained after distillation of coal tar.

The normally solid and relatively high melting bitumen pitch when solid acts as a stiffening element for the fibrous material impregnated or coated thereby, but when the bitumen is in the heat-softened condition bending and forming of the fibrous material is permitted. It is thus seen that by heating the fibrous impregnated material, forming it in the desired shape and allowing it to cool while it is retained in the formed shape, the impregnated fibrous material will hold its formed shape and may be readily used to maintain the magnesium oxychloride cement in the desired shape without the use of molds during the hardening or setting period. The bitumen or pitch also renders the fibrous material water-resistant and water-repellent. The pitch-impregnated fibrous material is shaped while warm, with the pitch or bitumen in the heat-softened condition, and then allowed to cool below its hardening temperature, thereby retaining the formed shape. The cooled pitch or bitumen serves as a shaping medium during the relatively long period required for setting of the magnesium oxychloride cement composition. The heat which is suddenly produced during a short period of the hardening or setting of the magnesium oxychloride cement apparently softens the bitumen with which it is in contact to cause formation of a strong bond therewith and facilitates the action of the bituminous particles in rendering the entire composition water-resistant.

Figure 1:
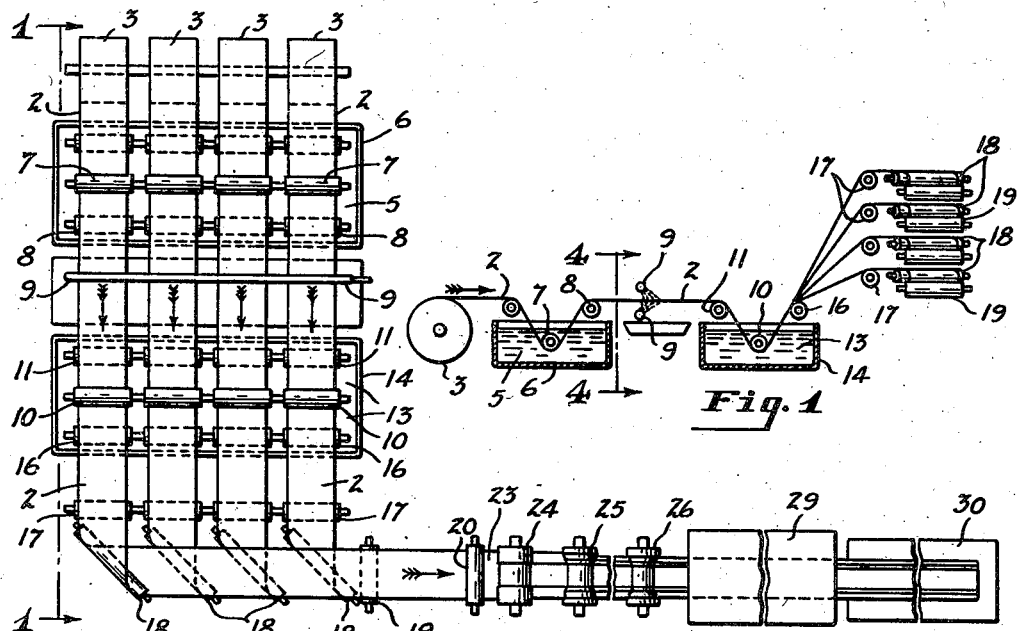
Figure 1 is a schematic side elevational view of a portion of apparatus suitable for preparing the shaped material embodying the present invention.
Figure 2:
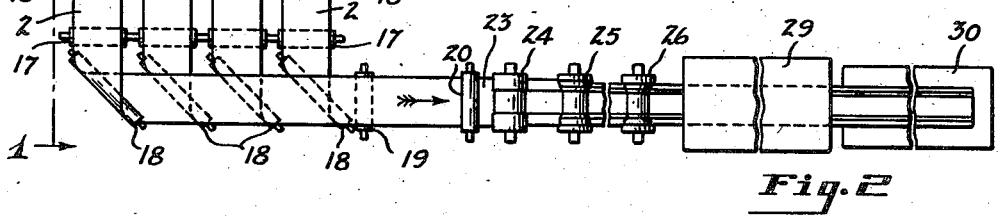
Fig. 2 is a schematic plan view of apparatus suitable for carrying out a process embodying the present invention.
Figure 3:
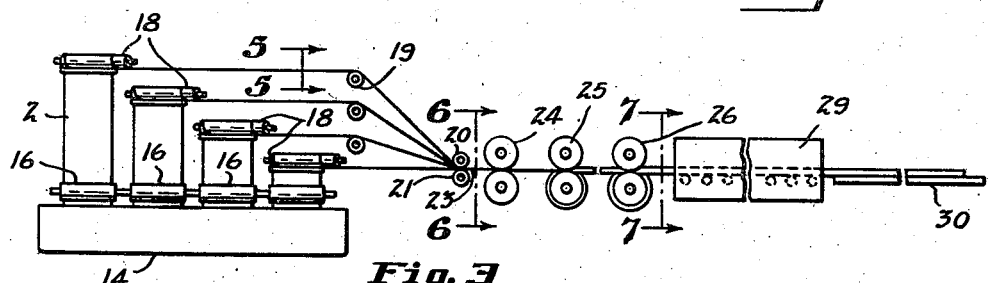
Fig. 3 is a schematic front elevational view of the apparatus of Fig. 2.
Figure 4:
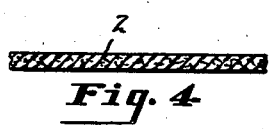
Fig. 4 is a sectional view on the line 4—4 of Fig. 1.
Figure 7:
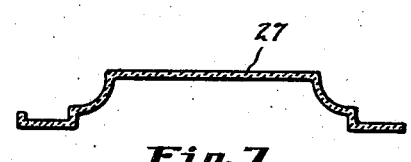
Fig. 7 is a sectional view through a shaped article embodying the present invention, taken on the line 7—7 of Fig. 3.
Figure 5:
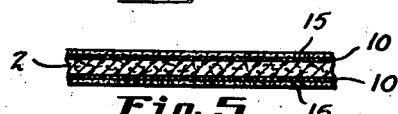
Fig. 5 is a sectional view on the line 5—5 of Fig. 3.
Figure 8:
Fig. 8 is a sectional view of a modified form of shaped article embodying the present invention.
Figure 6:
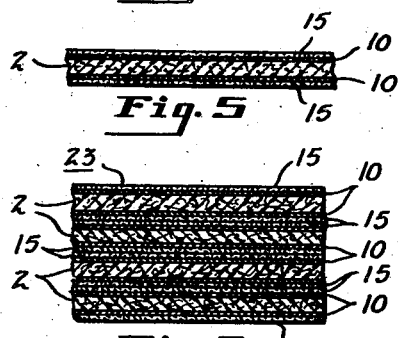
Fig. 6 is a sectional view on the line 6—6 of Fig. 3.

Referring to the drawings, and more particularly to Figs. 1 to 8 inclusive, in which like parts are designated by like numerals of reference throughout the several views, articles embodying the present invention may be prepared in substantially a continuous manner.

One or more, and preferably a plurality of strips of felted fibrous material 2 from a suitable source, such as rolls 3, are passed through molten pitch 5 or high melting bitumen in a tank 6. A relatively thin layer of a hardenable plastic composition, such as magnesium oxychloride cement, is applied on either side of the impregnated strips 2. The strips 2 are plied up to form a plurality of plies which are shaped while hot; the bitumen or pitch is allowed to cool in a shaped condition; and the plastic magnesium oxychloride cement composition is allowed to solidify.

The pitch or bitumen within the tank 6 is preferably in a relatively high heated condition so that impregnation of the fibrous material occurs rapidly upon passing it under an immersion roll 7. Excess material will readily drain from the fibrous sheet before passing over a guide roll 8.

The hot impregnated fibrous material is then passed between suitable external coating means, such as spray nozzles 9, where a thin coating 10 of a normally solid bitumen is applied to the outer surfaces of the impregnated fibrous sheets 2. The bitumen preferably has a somewhat lower melting point than that of the pitch 5. The coating 10 is preferably applied as a solution, which may be a solution of normally solid asphalt, e. g., gilsonite, in a volatile solvent. The coated impregnated fibrous material 2 from the spray zone may then pass over a guide roll 11 beneath an immersion roll 12, which may be submerged within warm or hot magnesium oxychloride cement composition 13 within the tank 14.

The plastic composition 13 is preferably composed of a mixture of magnesium oxychloride cement and finely divided, relatively high melting bitumen. The solid ingredients preferably comprise magnesium oxide, equal parts of a relatively finely divided high melting point pitch, such as core pitch, or the finely ground residue from tile oils from coal tar, such residue melting in the vicinity of 300° or more. The proportions of pitch and magnesium oxide and magnesium carbonate may, however, be varied in accordance with the requirements in given instances; but generally, the composition may contain from 1 part of magnesium oxide for each 2 parts of core pitch, or 2 parts of magnesium oxide to each part of core pitch. The magnesium chloride solution preferably is between 25 and 35 degrees Baumé and is mixed with the solid ingredients of the cement to form a creamy or plastic composition, as desired.

The coating of plastic composition 15 on the asphalt coated bitumen-impregnated fibrous material 2 is preferably in the neighborhood of about $\frac{1}{32}$ or $\frac{1}{16}$ of an inch in thickness, although heavier coatings may be used if desired.

Plastic coating material from a tank 14 may pass from a guide roll 16 through intervening means for guiding the plurality of parallel strips 2 into superimposed relationship. Such means may include suitable guide rolls 17 which cooperate with rolls 18. The rolls 18 are set at a 45-degree angle to the lines of travel of strip over guide rolls 19. The superimposed coated strips 2 from the rolls 19 of the superimposing and aligning means may be pressed together by passing the desired number of coated strips 2 between rolls 20 and 21. The rolls 20 and 21 serve as means for pressing the layers of coated strips together with the plastic coatings 15 on successive strips so that the coatings 15 on adjacent strips coalesce together and form a unitary layer between the successive plies 2.

The composite strip or sheet material 23 with the bitumen impregnated in the fibrous material 2 still in the hot or plastic condition is passed successively between contour rolls 24, 25 and 26. The rolls 24, 25 and 26 are adapted to shape the material in desired form, such for example as in the form of mold or panel 27 and/or a flat sheet 28 (see Fig. 8 of the drawings). The shaped material from the rolls 26 may then be allowed to cool, preferably by passing through a suitable cooling chamber 29 which functions to harden the relatively high melting bitumen or pitch impregnated within the fibrous material 2 and thus cause the latter to retain its formed shape. The pitch thus serves as means for retaining the plastic magnesium oxychloride cement in the desired formed shape until it has hardened. The composite laminated material from the cooling chamber 29 may be cut to the desired lengths.

It will be seen from the above that the laminated shaped material of the present invention comprises a plurality of layers of fibrous material impregnated with a relatively high melting point bitumen or pitch bonded together through interposed layers of a water-resistant hardened plastic composition comprising as essential ingredients magnesium oxychloride cement and a finely divided bitumen, which preferably has a high melting point.

The formed articles are of particular value in the making of caskets, moldings, laminated sheet material for structural building purposes and the like. The articles are strong, relatively light in weight, fireproof and not affected by water. Although the pitch and bitumen may be highly combustible, the magnesium cement in the composition renders it fire-resistant. On the other hand, the magnesium cement in the composition is adversely affected by water, but the finely divided, relatively high melting point pitch so increases the water-repellency and water-resistance that the composite article is unaffected by water.

Apparently it is desirable in order to obtain benefits of the present invention that the plastic cementitious composition used for bonding the bitumen-impregnated fibrous or paper material together have a relatively high exothermic reaction as I have been unable to obtain strong bonds by substituting other hard-setting cements, such as Portland cement, for all of the magnesium oxychloride cement in the composition.

When it is desirable to make the formed articles of the present invention still more shock-resistant or less brittle, the bitumen-impregnated plies 2 are preferably composed of a plurality of sheets of fibrous material, such as a fabric or felted paper. The sheets are impregnated with a relatively high melting bitumen or pitch, as above described, and are adhered together through an interposed layer or film of lower melting or more plastic, normally solid bitumen, such as gilsonite or similar asphalt.

Referring particularly to Figs. 9 to 12, inclusive, of the drawings, strips 2a and 2c of fibrous sheet material may be withdrawn from rolls 3a and 3c. The rolls 3a and 3c are arranged in a suitable manner so that the strips 2a and 2c are both passed over a suitable guide roll into the heated fluid pitch 5 within a tank 6. Upon emerging from the tank 6, the strips 2a and 2c are separated by suitable means such as the guide rolls 8a and 8c, respectively. A film or layer 2b of lower melting bitumen is then suitably applied between the separated pitch-impregnated sheets 2a and 2c. The layer 2b of lower melting bitumen or asphalt may be plied by coating or spraying the bituminous material 40 contained within the tank 41 through the spray nozzle 42 to the undersurface of the sheet 2a. The layer 2b may then be controlled in thickness by passing between the rolls 43 and 44. The impregnated sheet material 2a adhered through the layer of film 2b may then be united with the impregnated sheet 2c by suitable means, as by passage between the pressure rolls 45 and 46 to form a modified form of the composite bitumen-impregnated sheet 2, which is composed of layers 2a and 2c bonded together through the interposed film of lower melting bitumen 2b.

The composite impregnated sheet material thus formed is then preferably suitably coated with asphalt by means such as sprayers 9 and treated in the same manner as the impregnated sheets 2 of Figs. 1 to 8, inclusive.

It is to be understood that variations and modifications of the specific process and product herein shown and described for purposes of illustration may be made without departing from the spirit of the invention.

What I claim is:

1. A method of making formed articles which comprises applying a layer of a relatively hard-setting plastic composition containing magnesium oxychloride cement as a major binding ingredient over a fibrous material impregnated with a normally solid, high melting point bitumen composition, shaping the coated bitumen-impregnated fibrous material while said normally hard bitumen is heated to the relatively soft, deformable state, allowing said bitumen associated with said fibrous material to cool to harden and thus retain the fibrous material and said plastic composition in the desired shape, and permitting said plastic composition to harden.

2. In a method of making a formed article having a plurality of layers of fibrous material, which is impregnated with a normally solid non-plastic bitumen, bonded together through interposed layers of a hardened magnesium cement composition, the steps which comprise coating a plurality of strips of fibrous bitumen-impregnated sheet material with a plastic composition comprising magnesium oxychloride cement, superimposing said coated strips to obtain a composite strip of desired thickness, shaping the composite strip thus formed while the bitumen within the impregnated fibrous material is at elevated temperature and is in the plastic and flexible state, allowing said bitumen to cool to the hard non-plastic state to hold said fibrous material in shaped form, and allowing the plastic magnesium oxychloride cement composition to set and strongly bond the layers of fibrous material together.

3. In a method of making a shaped article comprising a plurality of layers of bitumen-impregnated fibrous material adhered together through interposed layers of magnesium cement composition, the steps which comprise impregnating fibrous strip material with a normally solid, non-plastic, relatively high melting bitumen, applying a coating of relatively lower melting bitumen over at least one of the surfaces of the bitumen-impregnated strip material, disposing a layer of plastic magnesium oxychloride cement composition over said coated surface, superimposing a plurality of strips with the magnesium cement coating on adjacent strips in contact to produce a composite strip, forming said composite strip to desired form with the impregnated bitumen in the plastic state, allowing the strip to cool to cause the impregnated fibrous material to substantially retain its formed shape, and permitting the magnesium cement in the composition to set and harden.

4. In a method of making shaped articles comprising magnesium oxychloride cement and a fibrous sheet material impregnated with a normally solid, hard, fracturable bitumen having a melting point of at least 300° F., the steps which comprise shaping a layer of said bitumen-impregnated fibrous material while said normally hard bitumen is heated to a relatively soft deformable state, allowing said bitumen assocated with said fibrous material to cool to retain the fibrous material and plastic magnesium oxychloride cement in contact therewith in the desired shape, and permitting said magnesium oxychloride cement to harden in contact with said shaped fibrous material, whereby the said layer after shaping acts to maintain said magnesium oxychloride cement in shaped form during the hardening thereof.

MAX SKOLNIK.